US008344900B2

(12) United States Patent
Fariello et al.

(10) Patent No.: US 8,344,900 B2
(45) Date of Patent: Jan. 1, 2013

(54) INTELLIGENT PATCH PANEL SENSOR MODULES HAVING INFRARED EMITTERS AND SENSORS FOR DETECTING PATCH CORDS

(75) Inventors: Patrick Fariello, Murphy, TX (US); Danny L. Satterthwaite, Allen, TX (US); Daniel W. Macauley, Fishers, IN (US)

(73) Assignee: CommScope, Inc. of North Carolina, Hickory, NC (US)

( * ) Notice: Subject to any disclaimer, the term of this patent is extended or adjusted under 35 U.S.C. 154(b) by 597 days.

(21) Appl. No.: 12/612,750

(22) Filed: Nov. 5, 2009

(65) Prior Publication Data

US 2010/0109892 A1 May 6, 2010

Related U.S. Application Data

(60) Provisional application No. 61/111,554, filed on Nov. 5, 2008.

(51) Int. Cl.
*G08B 21/00* (2006.01)
(52) U.S. Cl. .................. 340/653; 340/568.4; 340/686.1; 340/687; 439/620.01
(58) Field of Classification Search .................. 340/653, 340/815.45, 10.1, 10.42, 545.6, 568.4, 686.1, 340/687; 439/49, 404, 620.01, 489, 620.15, 439/620.21; 710/16; 379/32.01, 326, 438
See application file for complete search history.

(56) References Cited

U.S. PATENT DOCUMENTS

| | | | | |
|---|---|---|---|---|
| 5,764,043 | A * | 6/1998 | Czosnowski et al. | 324/66 |
| 6,222,908 | B1 * | 4/2001 | Bartolutti et al. | 379/27.01 |
| 6,424,710 | B1 * | 7/2002 | Bartolutti et al. | 379/326 |
| 6,688,910 | B1 * | 2/2004 | Macauley | 439/491 |
| 7,782,202 | B2 * | 8/2010 | Downie et al. | 340/572.1 |
| 8,116,434 | B2 * | 2/2012 | German et al. | 379/32.01 |
| 2006/0110977 | A1 | 5/2006 | Matthews | |
| 2006/0148279 | A1 | 7/2006 | German et al. | |

FOREIGN PATENT DOCUMENTS

GB 2347507 A 9/2000

OTHER PUBLICATIONS

Examination Report under Section 18(3) from the UK Patent Office corresponding to Application No. GB 1106228.8; Date of report: Oct. 3, 2011; 2 pages.

Notification of Transmittal of the International Search Report and Written Opinion issued by the European Patent Office on Mar. 29, 2010 for the corresponding PCT Application No. PCT/US2009/063337.

* cited by examiner

*Primary Examiner* — Toan N Pham
(74) *Attorney, Agent, or Firm* — Myers Bigel Sibley & Sajovec, P.A.

(57) ABSTRACT

A communications patching system includes a patch panel having a plurality of connector ports on a side thereof, and a sensor module secured to the patch panel side. The sensor module includes a plurality of pairs of IR emitters and sensors, with each emitter/sensor pair located adjacent to a respective one of the connector ports. Each emitter/sensor pair is configured to detect insertion and removal of a patch cord connector from a respective connector port. The sensor module includes a housing and a printed circuit board (PCB) secured to the housing. The IR emitters and sensors are electrically connected to the PCB, and the PCB includes a processor and memory for controlling the IR emitters and sensors.

24 Claims, 10 Drawing Sheets

INTELLIGENT PATCH PANEL SENSOR MODULES HAVING INFRARED EMITTERS AND SENSORS FOR DETECTING PATCH CORDS

RELATED APPLICATION

This application claims the benefit of and priority to U.S. Provisional Patent Application No. 61/111,554, filed Nov. 5, 2008, the disclosure of which is incorporated herein by reference as if set forth in its entirety.

FIELD OF THE INVENTION

The present invention relates generally to communications systems and, more particularly, to communications patching systems.

BACKGROUND

Many businesses have dedicated communications systems that enable computers, servers, printers, facsimile machines and the like to communicate with each other, through a private network, and with remote locations via a telecommunications service provider. In, for example, commercial office buildings, the dedicated communications system may be hard wired using communications cables that contain conductive wire. In such hard wired systems, individual connector ports such as modular wall jacks are mounted in offices throughout the building. Communications cables are run through, for example, the walls and/or ceiling of the building to electrically connect each connector port to network equipment (e.g., network servers) that are located in, for example, a telecommunications closet or computer room. Communications cables from external telecommunication service providers may also terminate within the computer room or telecommunications closet.

Communications patching systems are often used to interconnect the various communication cables within a computer room or telecommunications closet. These communications patching systems may facilitate terminating the cables in an organized fashion, and may also simplify the process for later making changes to the connections between communications cables. Typically, a communications patching system includes one or more mounting frames, usually in the form of equipment racks. Network equipment such as, for example, network servers and switches may be mounted on these mounting frames, as may one or more "patch panels." As is known to those of skill in the art, a "patch panel" refers to an interconnect device that includes a plurality of connector ports such as, for example, communications jacks or fiber optic couplers on at least one side thereof. Each connector port (e.g., a jack) is configured to receive a communications cable that is terminated with a mating connector (e.g., a plug). One or more communications cables may also be terminated into a reverse side of the patch panel (the communications wires of each cable can be terminated into individual contacts or couplers such as, for example, insulation displacement contacts that are often used to terminate the conductors of a twisted pair cable, or may be terminated using a connector port such as would be the case with an RJ-45-to-RJ-45 patch panel). Each connector port on the patch panel may provide communications paths between a communications cable that is plugged into the connector port and a respective one of the communications cables that is terminated into the reverse side of the patch panel. Communications patching systems are typically used to connect individual connector ports in offices throughout the building to, for example, network equipment in the computer room of the building.

Figure 1:
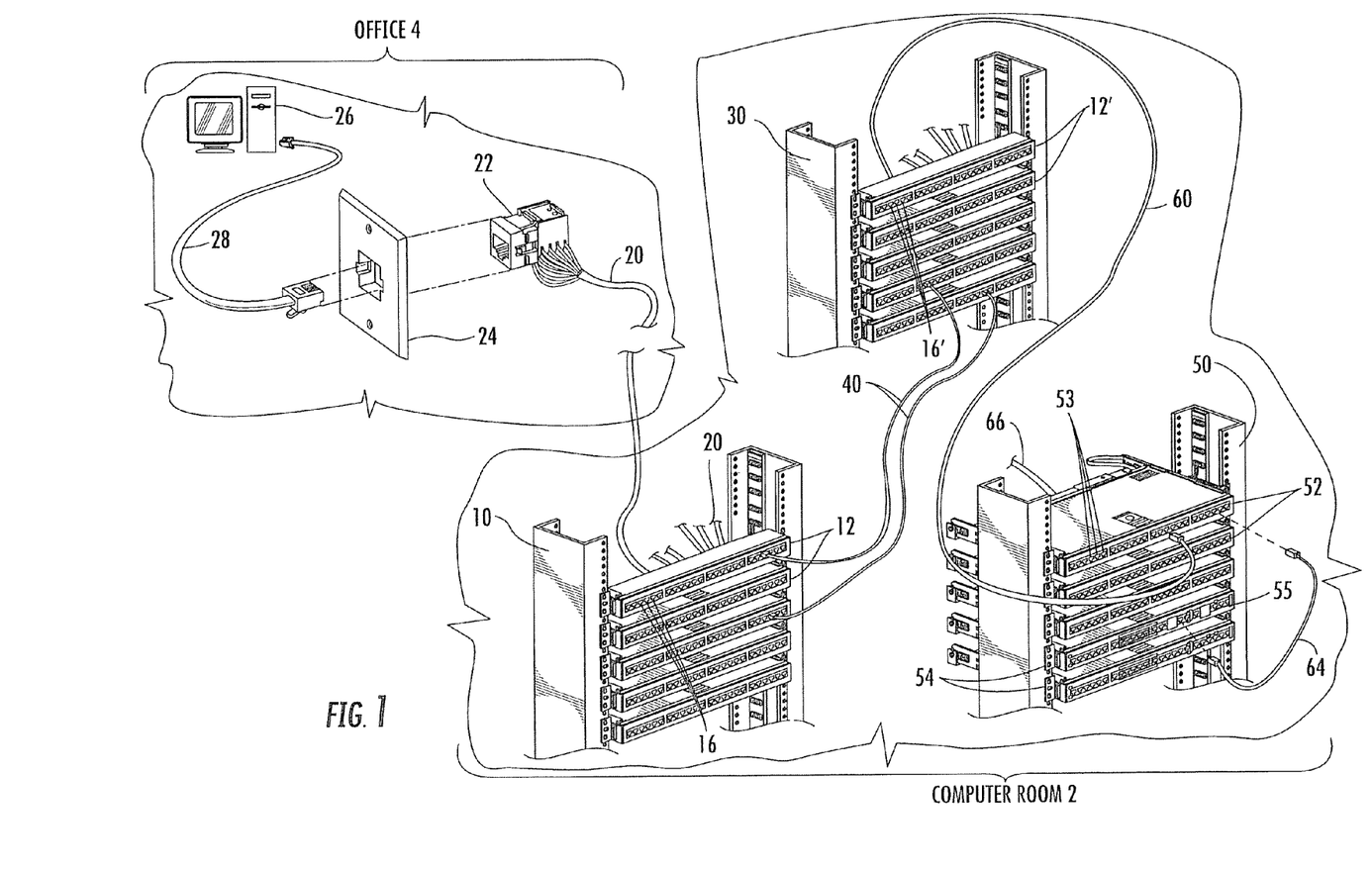
FIG. 1 is a schematic view of a simplified prior art cross-connect communications patching system.

FIG. 1 is a simplified example of one way in which a computer 26 in an office or other room 4 of a building may be connected to network equipment 52, 54 located in, for example, a computer room 2 of the building. As shown in FIG. 1, the computer 26 is connected by a patch cord 28 to a modular wall jack 22 that is mounted in a wall plate 24 in office 4. A communications cable 20 is routed from the back end of the modular wall jack 22 through, for example, the walls and/or ceilings of the building, to the computer room 2. As there will often be hundreds or thousands of wall jacks 22 within an office building, a large number of cables 20 are routed into the computer room 2.

A first equipment rack 10 is provided within the computer room 2. A plurality of patch panels 12 are mounted on the first equipment rack 10. Each patch panel 12 includes a plurality of connector ports 16. In FIG. 1, each connector port 16 comprises a modular RJ-45 jack that is configured to receive a modular RJ-45 plug connector. However, it will be appreciated that other types of patch panels may be used such as, for example, patch panels with optical fiber connector ports 16 (e.g., SC, ST, and LC ports) or patch panels with other types of twisted copper wire pair connector ports 16 (e.g., RJ-11 ports).

As shown in FIG. 1, each communications cable 20 that provides connectivity between the computer room 2 and the various offices 4 in the building is terminated onto the back end of one of the connector ports 16 of one of the patch panels 12 on equipment rack 10. A second equipment rack 30 is also provided in the computer room 2. A plurality of patch panels 12' that include connector ports 16' are mounted on the second equipment rack 30. A first set of patch cords 40 (only two exemplary patch cords 40 are illustrated in FIG. 1) are used to interconnect connector ports 16 on the patch panels 12 to respective ones of the connector ports 16' on the patch panels 12'. The first and second equipment racks 10, 30 may be located in close proximity to each other (e.g., side-by-side) to simplify the routing of the patch cords 40.

As is further shown in FIG. 1, network equipment such as, for example, one or more switches 52 and network routers and/or servers 54 ("network devices") are mounted on a third equipment rack 50. Each of the switches 52 may include a plurality of connector ports 53. A second set of patch cords 60 connect the connector ports 53 on the switches 52 to the back end of respective ones of the connector ports 16' on the patch panels 12'. As is also shown in FIG. 1, a third set of patch cords 64 may be used to interconnect other of the connector ports 53 on the switches 52 with connector ports 55 provided on the network devices 54. In order to simplify FIG. 1, only a single patch cord 60 and a single patch cord 64 are shown. Finally, one or more external communications lines 66 are connected to, for example, one or more of the network devices 54. In many instances, the communication lines 66 would terminate onto a patch panel and be connected to the network device 54 via a patch cord. For simplicity, the external communication line 66 is pictured as a cable/cord 66 in FIG. 1, which may be the actual external communication line or, alternatively, may be a patch cord that is connected to a patch panel connector port which the actual external communication line is terminated into.

The communications patching system of FIG. 1 may be used to connect each computer, printer, facsimile machine and the like 26 located throughout the building to local area network ("LAN") switches 52, the LAN switches 52 to network routers 54, and the network routers 54 to external communications lines 66, thereby establishing the physical connectivity required to give devices 26 access to both local and wide area networks. In the patching system of FIG. 1, connectivity changes are typically made by rearranging the patch cords 40 that interconnect the connector ports 16 on the patch panels 12 with respective connector ports 16' on the patch panels 12'.

The equipment configuration shown in FIG. 1, in which each wall jack 22 is connected to the network equipment 52, 54 through at least two patch panels 12, 12', is referred to as a "cross-connect" patching system. In another commonly used equipment configuration, which is typically referred to as "inter-connect" patching system, the communications path from each modular wall jack 22 to the network devices 54 typically passes through a single patch panel 12.

Figure 2:
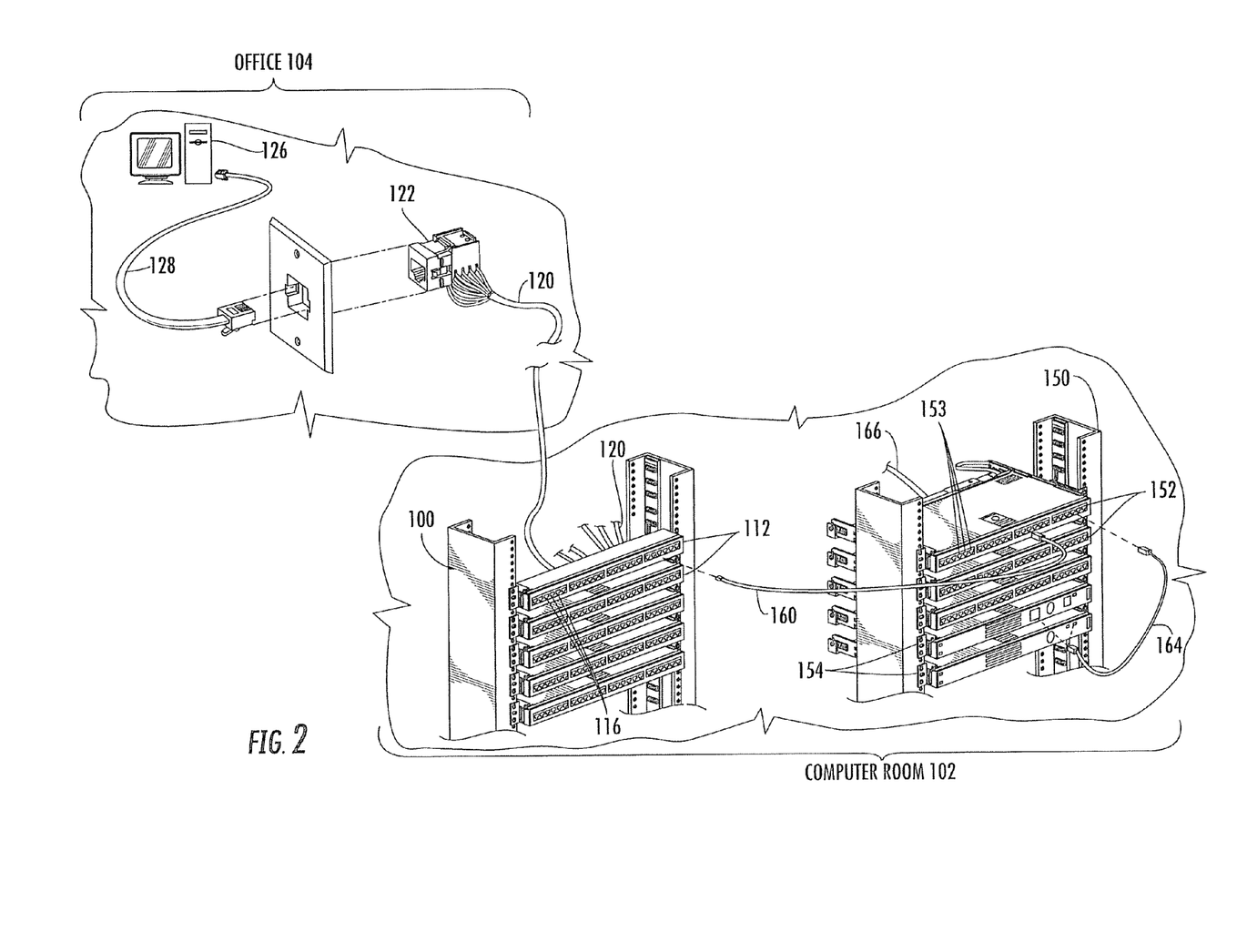
FIG. 2 is a schematic view of a simplified prior art inter-connect communications patching system.

FIG. 2 depicts a simplified version of an inter-connect patching system that is used to connect a plurality of computers 126 (and other networked equipment) located in the rooms 104 throughout an office building to a plurality of network devices 154 that are located in a computer room 102 of the building. As shown in FIG. 2, a plurality of patch panels 112 are mounted on a first equipment rack 110. Each patch panel 112 includes a plurality of connector ports 116. A plurality of communications cables 120 are routed from wall jacks 122 in offices 104 into the computer room 102 and connected to the reverse side of the patch panels 112. The computers 126 are connected to respective modular wall jacks 122 by patch cords 128.

As is further shown in FIG. 2, network equipment such as, for example, one or more network devices 154, are mounted on a second equipment rack 150. One or more external communications lines 166 are connected (typically through one or more patch panels and patch cords) to one or more of the network devices 154. A plurality of switches 152 that include a plurality of connector ports 153 are also provided. The switches 152 may be connected to the network devices 154 using a first set of patch cords 164 (only one patch cord 164 is shown in FIG. 2). A second set of patch cords 160 (only one patch cord 160 is shown in FIG. 2) are used to interconnect the connector ports 116 on the patch panels 112 with respective ones of the connector ports 153 on the switches 152. In the patching system of FIG. 2, connectivity changes are typically made by rearranging the patch cords 160 that interconnect the connector ports 116 on the patch panels 112 with respective connector ports 153 on the switches 152.

The patch cords in a patching system may be rearranged quite often. The interconnections of the various patch cords in a patching system are typically logged in either a paper or computer-based log. However, technicians may neglect to update the log each and every time a change is made, and/or may make errors in logging changes. As such, paper- or computer-based logs may not be 100 percent accurate so that a technician cannot have full confidence from reading the log where each of the patch cords begins and ends. Accordingly, each time a technician needs to change a patch cord, the technician often manually traces that patch cord between two connector ports. To perform a manual trace, the technician locates one end of a patch cord and then manually follows the patch cord until he/she finds the opposite end of that patch cord.

Due to the large number of patch cords that are typically used at any one time and/or the cable routing mechanisms that are often used to keep the cable of each patch cord neatly routed, it may take a significant amount of time for a technician to manually trace a particular patch cord. Furthermore, manual tracing may not be completely accurate as technicians may accidentally switch from one patch cord to another during a manual trace. Such errors may result in misconnected communication cables which must be later identified and corrected. Thus, ensuring that the proper connections are made can be time-consuming, and the process is prone to errors in both the making of connections and in keeping records of the connections.

Circuit boards that can be added to conventional patch panels to sense whether a patch cord is plugged into a connector port are known. A shortcoming of these circuit boards is that trained factory personnel are typically required to assemble the circuit board that provides the sensing technology to a patch panel. This is because the patch panels typically need to be modified to facilitate the mounting of the circuit board thereto. In addition, the circuit board needs to be protected from damage during assembly. Another shortcoming is that mechanical switches are used to detect patch cord connector insertion and removal, and these switches require special handling and installation procedures to ensure proper operation.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

In view of the above discussion, intelligent sensor modules that can be installed on patch panels without requiring any patch cords to be removed and, thus, without disrupting service, are provided. According to some embodiments, a communications patching system includes a patch panel having a plurality of connector ports on a side thereof, and a sensor module secured to the patch panel side. The sensor module comprises a plurality of pairs of IR emitters and sensors, with each emitter/sensor pair located adjacent to a respective one of the connector ports. Each emitter/sensor pair is configured to detect insertion and removal of a patch cord connector from a respective connector port. The sensor module includes a housing and a printed circuit board (PCB) secured to the housing. The IR emitters and sensors are electrically connected to the PCB, and the PCB includes a processor and memory for controlling the IR emitters and sensors.

In some embodiments, the memory contains firmware executable by the processor for controlling the IR emitters and sensors. In some embodiments, the memory contains firmware executable by the processor for filtering out unwanted IR signals and/or reflections of IR signals from external sources. In some embodiments, the memory contains firmware executable by the processor for compensating for IR reflections from various types of patch cord connector surfaces.

In some embodiments, the sensor module provides protection against physical damage to the various electrical components and also provides protection against static electricity. For example, the housing may include protective walls that surround the IR emitters and sensors. The PCB may include a conductive element or ring that protects the IR emitters and sensors from static electricity.

According to some embodiments of the present invention, a communications patching system includes a patch panel having a plurality of connector ports on a side thereof, one or more patch cords, and a sensor module secured to the patch panel side. Each patch cord is configured to selectively connect respective pairs of patch panel connector ports. Each patch cord includes opposite ends with a connector attached thereto, and each connector for a respective patch cord includes an IR-reflective label that creates a unique reflective signature when exposed to IR radiation. The sensor module includes a plurality of pairs of IR emitters and sensors, and is secured to the patch panel such that each emitter/sensor pair is located adjacent to a respective one of the connector ports. Each pair is configured to detect insertion and removal of a patch cord connector from a respective connector port.

The sensor module includes a housing and a printed circuit board (PCB) secured to the housing, and the IR emitters and sensors are electrically connected to the PCB. The PCB also includes a processor and memory for controlling the IR emitters and sensors. Each IR sensor is configured to detect a reflective signature from a patch cord connector. The memory contains firmware executable by the processor that parks a connector port in response to detecting an unauthorized reflective signature from a patch cord connector.

According to some embodiments of the present invention, a patch cord for use in a communications patching system includes opposite ends with a connector attached to each end. Each connector includes an IR-reflective label that creates a unique reflective signature when exposed to IR radiation.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION

The present invention now is described more fully hereinafter with reference to the accompanying drawings, in which some embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present.

It will be understood that, although the terms "first", "second", etc. may be used herein to describe various elements, components, patch panels, etc., these elements, components, patch panels etc. should not be limited by these terms. These terms are only used to distinguish one element, component, patch panel, etc. from another element, component, patch panel. Thus, a "first" element, component, or patch panel discussed below could also be termed a "second" element, component, or patch panel without departing from the teachings of the present invention. In addition, the sequence of operations (or steps) is not limited to the order presented in the claims or figures unless specifically indicated otherwise.

Figure 3:
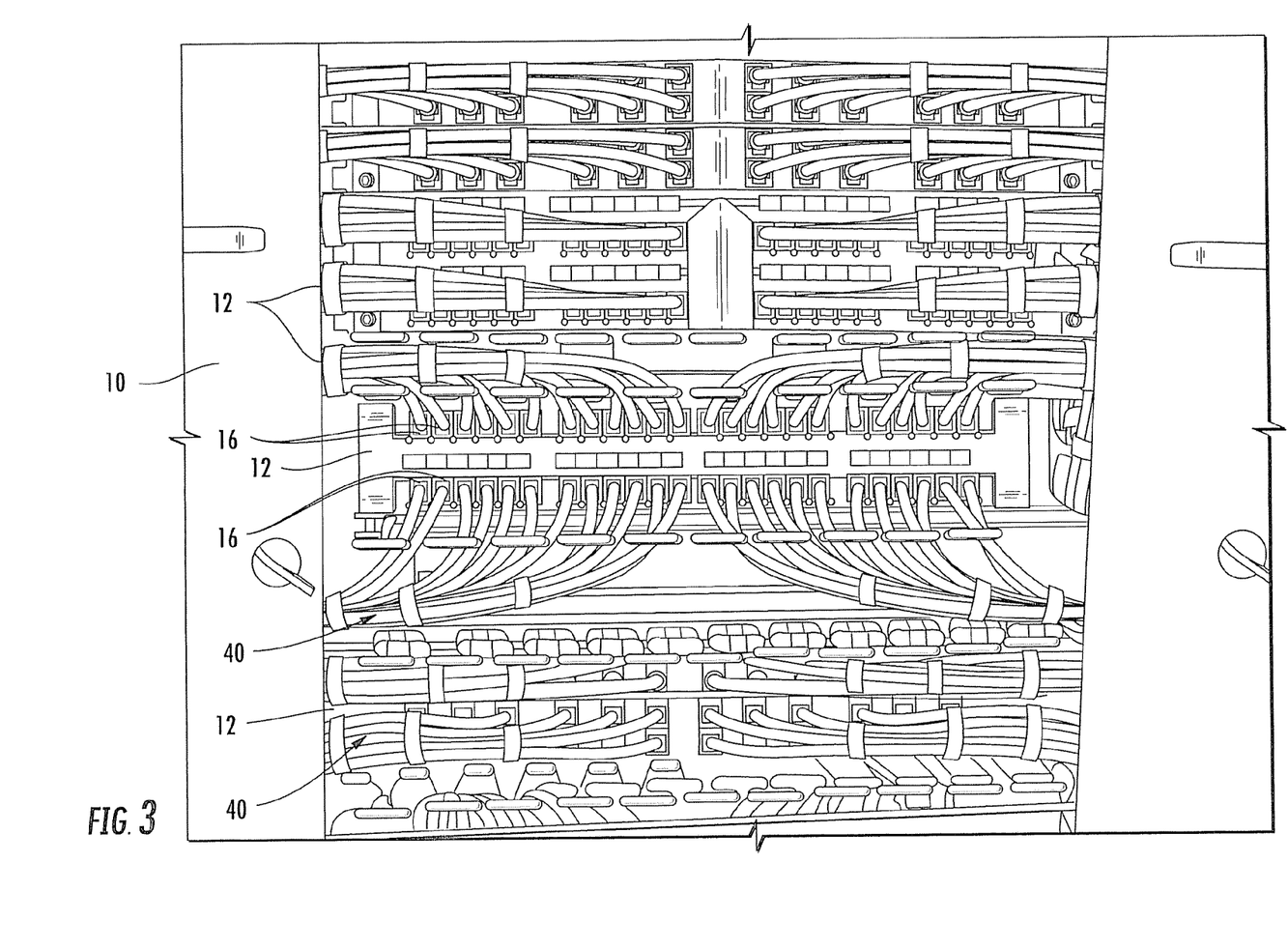
FIG. 3 is a partial front view of an equipment rack containing a plurality of patch panels on which sensor modules, according to embodiments of the present invention, may be attached.
Figure 4:
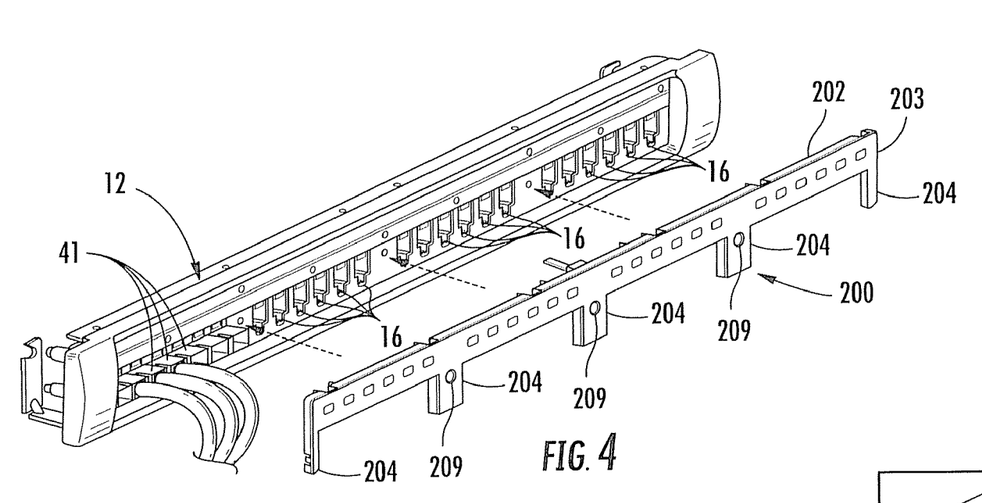
FIG. 4 is an exploded perspective view of a patch panel and patch cord sensor module, according to some embodiments of the present invention.
Figure 5:
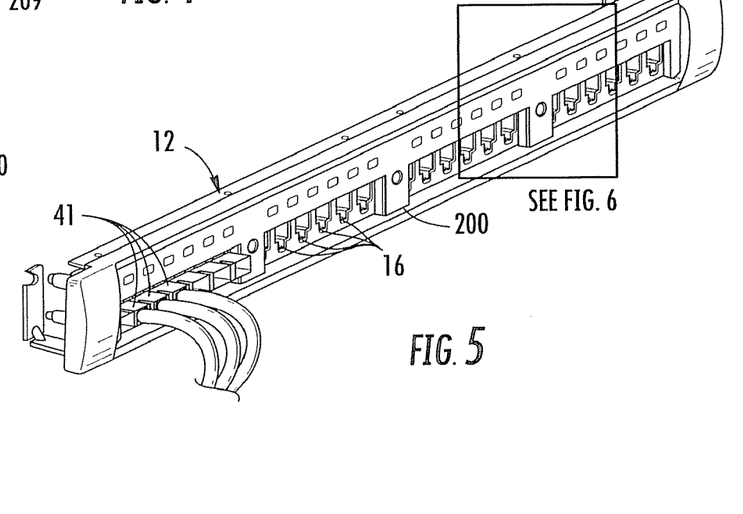
FIG. 5 is a perspective view of the patch panel of FIG. 4 with the is sensor module attached thereto.
Figure 6:
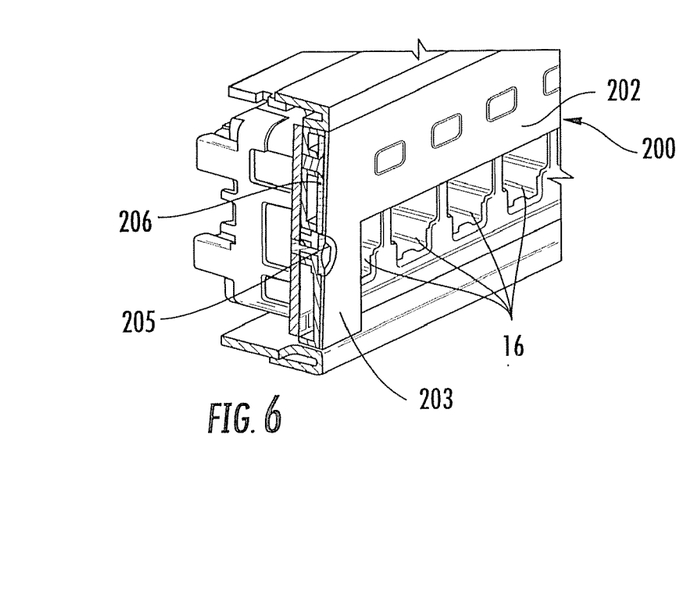
FIG. 6 is an enlarged, partial perspective view of the patch panel and sensor module of FIG. 5.

FIG. 3 illustrates an equipment rack 10 containing a plurality of patch panels 12 for a communication network patching system. As illustrated, a plurality of patch cords 40 are installed in respective ports 16 of the patch panels 12. Sensor modules according to embodiments of the present invention may be mounted directly to patch panels 12, such as those illustrated in FIG. 3, without requiring removal of the installed patch cords 40.

Referring to FIGS. 4-8, a sensor module 200 for installation on patch panels 12 with copper wire connector ports (e.g., RJ-45 ports, etc.) 16 is illustrated according to some embodiments of the present invention. The illustrated sensor module 200 has a "comb-like" configuration with an elongated, substantially rectangular body portion 202 having a plurality of spaced apart members 204 extending downwardly therefrom. The comb-like configuration of the illustrated sensor module 200 allows the sensor module 200 to be secured to a patch panel 12 without disturbing any patch cords 40 connected to the patch panel 12. As such, the sensor module 200 can be installed on patch panels without requiring any patch cords to be removed and, thus, without disrupting service.

Although illustrated with a comb-like configuration, the sensor module 200 can have other shapes and configurations. For example, in some embodiments, the sensor module 200 can have a rectangular shape (i.e., no members 204 extending therefrom) and the sensor module 200 can be inserted above or below the patch cords 40 on the patch panel 12.

In some embodiments, the sensor module 200 is secured to the patch panel 12 via fasteners 205 (see FIG. 6), such as screws, rivets, bolts, etc. The fasteners 205 are inserted through apertures 209 in the sensor module 200 and are secured to the patch panel 12, for example, via corresponding apertures, threaded passages, etc, as would be understood by those skilled in the art. In some embodiments, the sensor module 200 may be adhesively or magnetically secured to the patch panel 12.

The body portion 202 of the sensor module 200 includes a housing 203, a printed circuit board (PCB) 206 (see FIG. 6) and a plurality of pairs of infrared (IR) emitters 208 and sensors 210 (see FIG. 7) operably connected to the circuitry of the PCB 206., for example, connected via adhesive, connected via fasteners, etc. The PCB 206 is secured to the housing 203. The housing 203 surrounds and serves as a support structure for the PCB and the IR emitters 208 and sensors 210. The PCB also includes a processor and memory (not shown). The memory contains firmware executable by the processor for controlling the IR emitters 208 and sensors 210. The PCB 206, IR emitters 208, sensors 210, processor and memory obtain power from, for example, a rack controller associated with the patch panel 12. Although, in some embodiments, power may be obtained from another source/component. An outer surface of the PCB 206 may include an overlay 207, which is a protective covering material.

The IR emitters and sensors 208, 210 are configured to sense the insertion and removal of patch cords into and from the patch panel connector ports 16. In some embodiments, an IR emitter/sensor pair can be in the same device/package or in separate packages. In the embodiment illustrated in FIGS. 5 and 6, each IR sensor and emitter are in the same package. In other embodiments, the IR emitter 208 and IR sensor 210 of a pair are separate devices in separate packages. Exemplary IR emitters 208 and sensors 210 that may be utilized with embodiments of the present invention are available from Sun- LED Corp., Walnut, Calif. However, various types of IR emitters and sensors may be utilized, without limitation.

Figure 7:
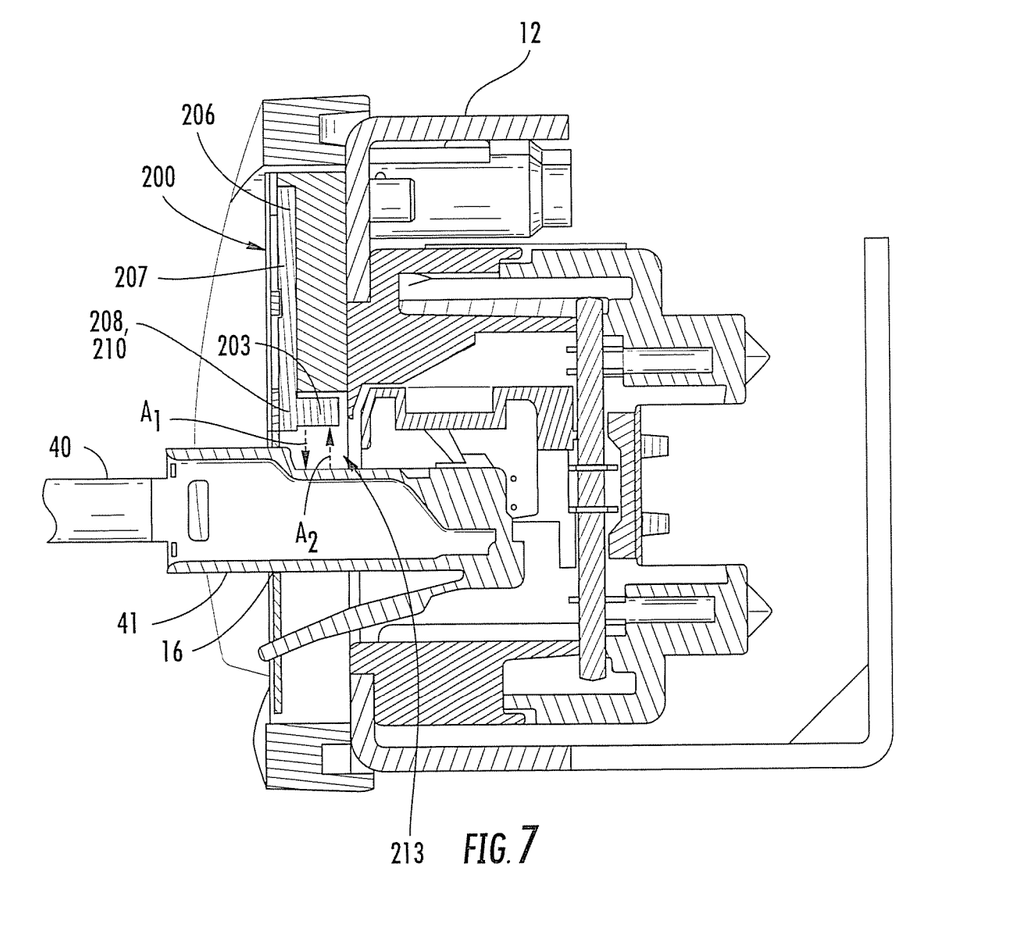
FIG. 7 is a cross section view of the patch panel and sensor module of FIG. 5 illustrating a patch cord connector inserted within a connector port and illustrating the location of the PCB and an IR emitter/sensor pair.

Each IR emitter/sensor pair 208, 210 in the illustrated embodiment is configured to be positioned above or below a respective one of the connector ports 16 when the sensor module 200 is secured to the patch panel 12. As illustrated in FIG. 7, the sensor module housing 203 has a structure such that a passageway 213 is provided from each IR emitter/sensor pair to a respective connector port 16. This structure ensures that no obstruction of an IR beam or its reflection can occur between the IR emitter/sensor pair and a connector port 16. In operation, an IR emitter 208 emits an infrared signal and the corresponding sensor 210 looks for a reflection of the signal to sense the presence of a patch cord connector 41.

As illustrated in FIG. 7, a patch cord connector 41 of a patch cord 40 is inserted within a connector port 16 of the patch panel 12. An IR beam, indicated by down arrow $A_1$, is emitted by the emitter 208. A reflection of the IR beam, indicated by the up arrow $A_2$, is caused by the patch cord connector 41, and is detected by the sensor 210. The passageway 213 ensures that the IR beam $A_1$ is not scattered and that the reflection $A_2$ is not scattered. Also, the passageway 213 ensures that IR from an external source cannot negatively affect operations. In response to detecting the IR beam, the sensor 210 sends a signal to the processor that a patch cord connector 41 is inserted in the connector port 16. The presence and absence of a patch cord connector 41 within a respective connector port 16 is communicated by the sensor module processor to a rack controller, as would be understood by those skilled in the art.

The sensor module firmware also includes an algorithm that is configured to compensate for various types of patch cord connector surfaces and surface geometries that reflect an IR beam. Some types of patch cord connectors (e.g., RJ-11 connectors) may not have as large a surface as other types of patch cord connectors (e.g., RJ-45) and, thus, may have difficulty reflecting an IR beam with sufficient strength to facilitate detection by a sensor 210. Moreover, the shape of some patch cord connectors 41 can affect the strength of a reflected IR beam. To compensate for different connector surfaces, the algorithm can employ several techniques including, but not limited to, wave shape analysis, timing, and level sensing. Because the algorithm can adapt to different reflective surfaces, the sensor module 200 can be utilized on patch panels with connector ports configured to receive almost any type of patch cord connector.

According to embodiments of the present invention, the algorithm is also configured to filter out unwanted IR reflections, for example, from other IR emitting sources, e.g., natural sunlight, overhead light sources such as halogen lights, flashlights, other IR transmitting equipment, etc. To compensate for these other IR sources, the algorithm can employ several techniques including, but not limited to, IR background level sensing, timing, and waveform analysis.

Techniques for determining the presence of a patch cord within a connector port are listed below in Table 1.

TABLE 1

1) A processor reads the IR sensor before turning on the emitter to determine the level of background IR which sets the minimum signal level.
2) The processor uses this reading to determine if there is too much IR being detected. This can be caused by temporary reflections when a user is working on the panel or when a flashlight is being used in the room.
3) Once the upper and lower limits are determined, the processor will turn on the IR emitter with a digital pulse. One of the first TABLE 1-continued measurements the algorithm can used is the time for the sensor to pick up the reflective IR.
4) The measurement of the time to receive the reflective IR combined with the Initial level that crosses the minimum signal level is used to determine the insertion of the plug.
5) Although step 4 could be used solely for the detection of a plug, there are a variety of different manufacturers of patch cords that have different reflective characteristics. This requires other methods to accurately determine the insertion of a patch cord. Some of these techniques are described in step 6.
6) Other measurements that are used to improve the detection algorithm include the initial slope of the IR waveform, the time to reach the strongest IR reflective signal, the level of the strongest IR Signal, the number of transitions in the signal and the time for the signal to be lost after the transmitter is turned off.

As described above, in addition to using an algorithm, background IR can be reduced or eliminated by recessing the IR sensors 210 within the sensor module 200 and creating a passageway that blocks out background IR. In addition, the PCB 206 can be coated with a non-reflective solder mask to reduce or eliminate reflections.

Figure 8:
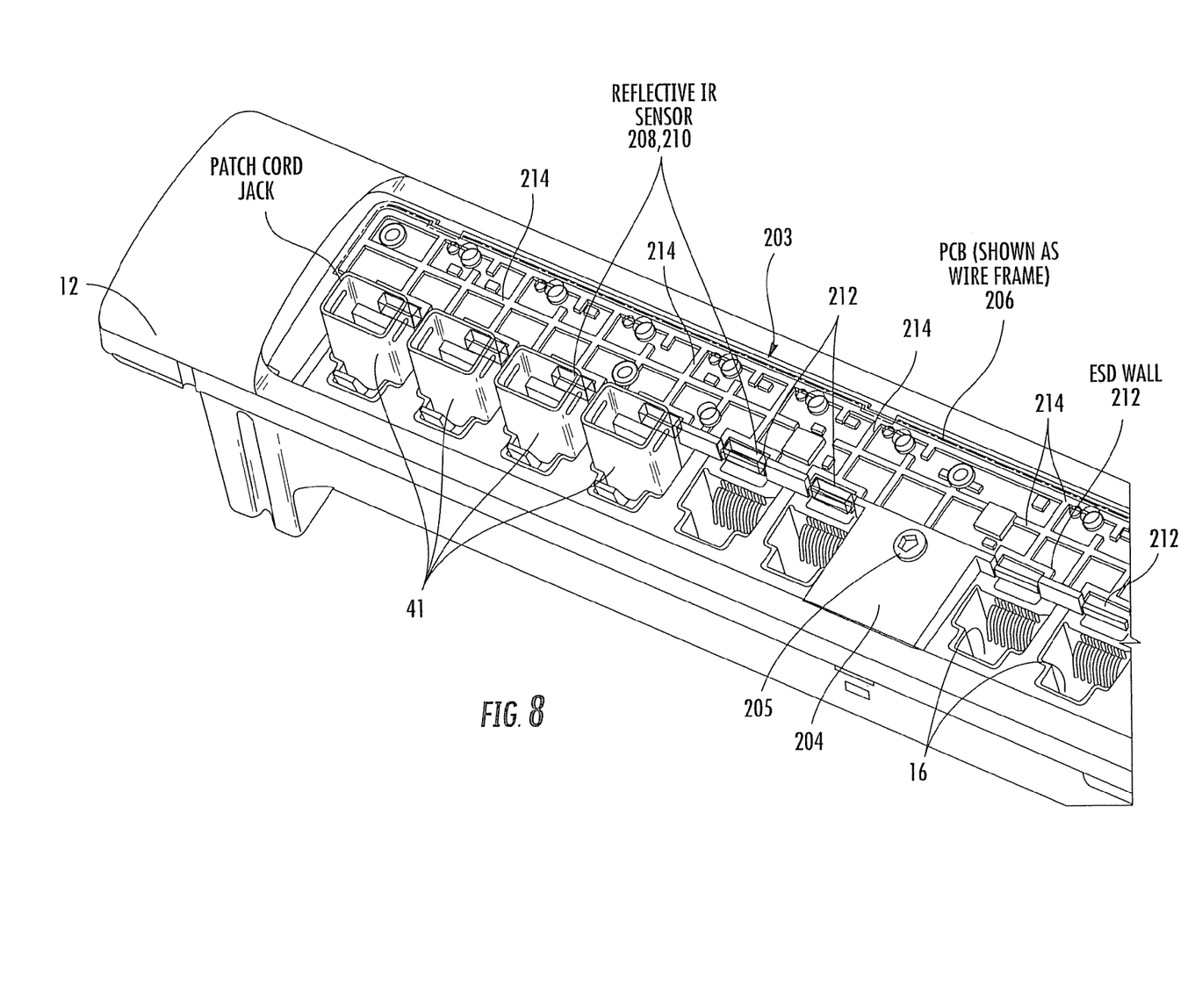
FIG. 8 is a partial perspective view of the patch panel and sensor module of FIG. 5 illustrating various protective walls of the sensor module housing, according to some embodiments of the present invention.
Figure 9:
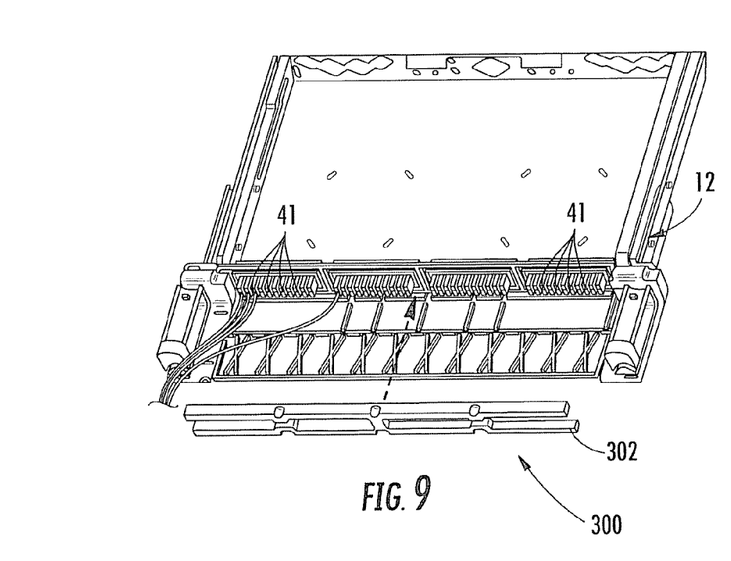
FIG. 9 is an exploded perspective view of a patch panel and patch cord sensor module, according to other embodiments of the present invention.
Figure 10:
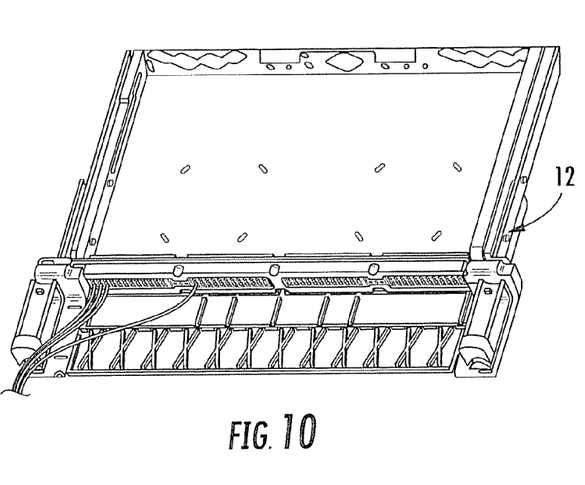
FIG. 10 is a perspective view of the patch panel of FIG. 9 with the sensor module attached thereto.
Figure 11:
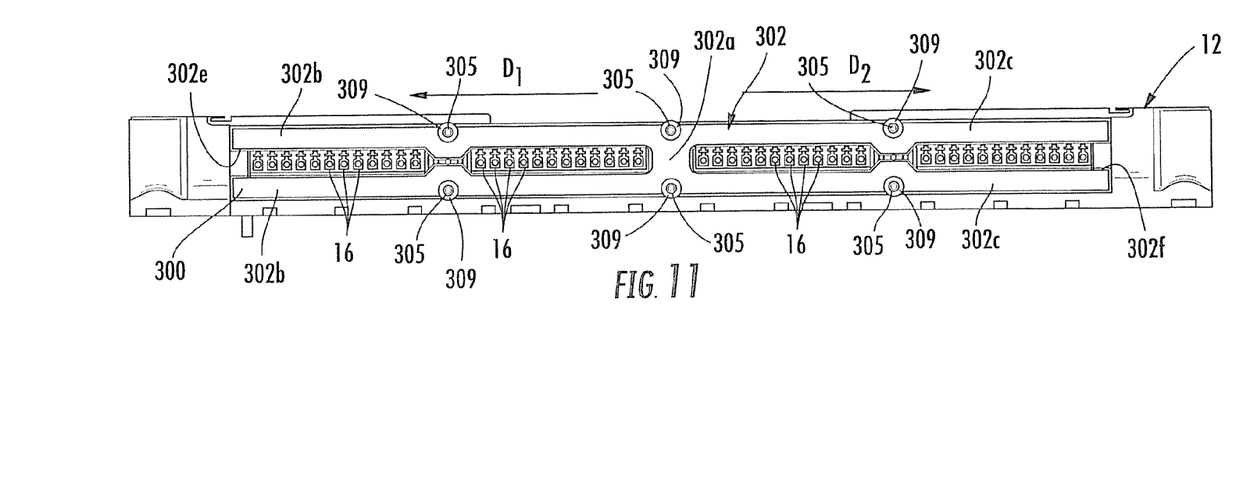
FIG. 11 is a front plan view of the patch panel and sensor module of FIG. 10.
Figure 12:
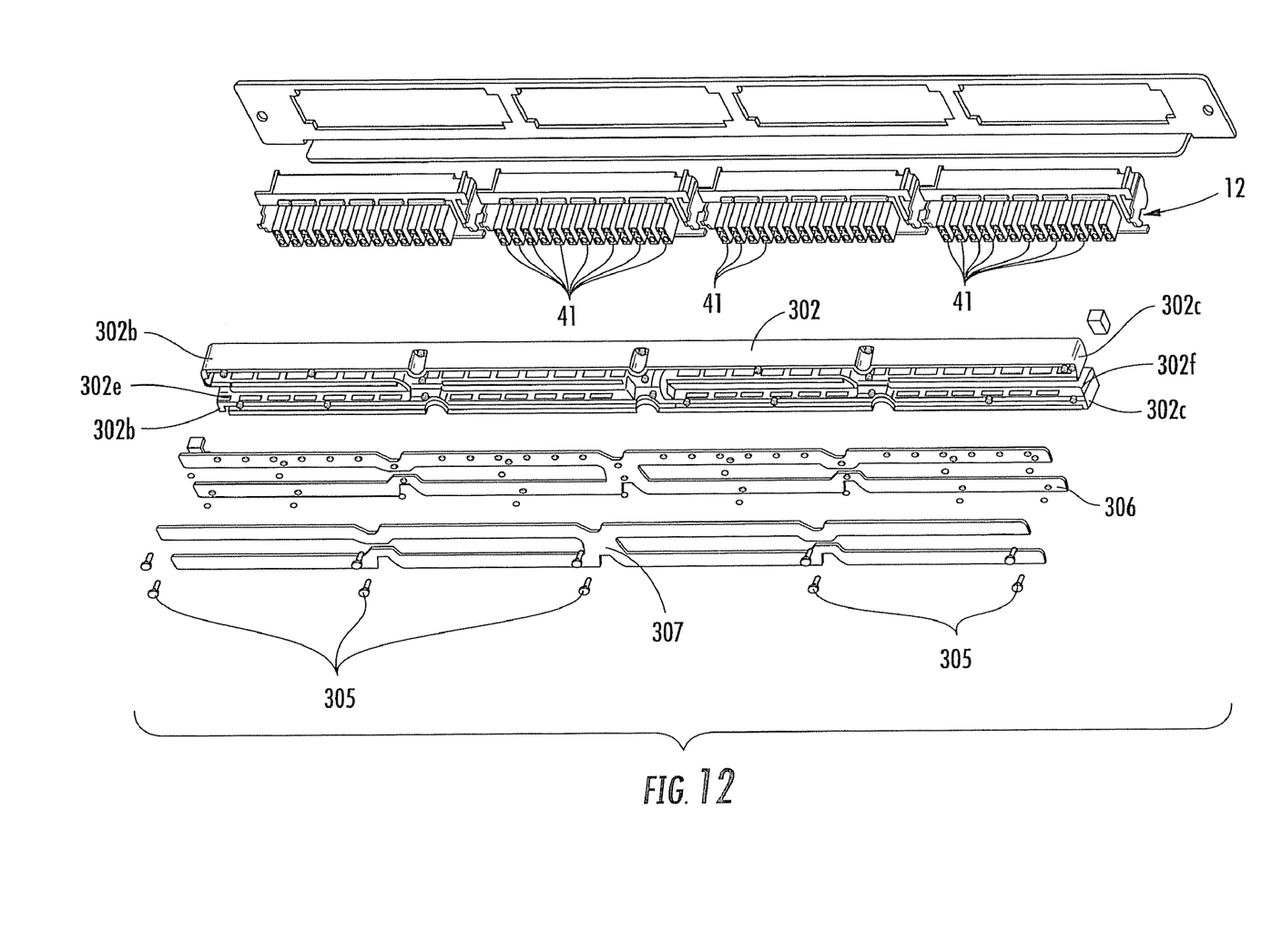
FIG. 12 is an exploded perspective view of the patch cord sensor module of FIG. 9.

In some embodiments, the housing 203 of the sensor module 200 includes protective structures to protect the IR emitters and sensors 208, 210 from physical damage and/or damage due to static electricity. Referring to FIG. 8, the housing 203 of the sensor module 200 is shown as a wire frame model to illustrate the structural configuration thereof. The housing 203 includes walls 212 that serve as physical barriers around each IR emitter and sensor 208, 210, as illustrated. The housing 203 also includes walls or reinforcement members 214 that provide structural integrity to the sensor module 200. The housing 203 of the sensor module 200 may be formed from any of various materials (e.g., polymeric materials, etc.) and the illustrated walls 212, 214 may be molded into the housing 203, as would be understood by those of skill in molded components. Virtually any type of structure may be utilized to protect the IR emitters and sensors 208, 210 from static. Embodiments of the present invention are not limited to the illustrated walls 212, 214 and configuration thereof. The walls 212 may be electrically conductive (or parts thereof are electrically conductive) and grounded to protect the IR emitters and sensors 208, 210 from static electricity.

According to some embodiments of the present invention, the PCB 206 may include a conductive member or ring (not shown) that is grounded and that serves the purpose of protecting the electronic components (processor, memory, IR emitters, IR sensors) from static electricity. The conductive ring may have virtually any configuration. In some embodiments, the conductive ring extends around a periphery of the PCB 206 to protect all of the electronic components thereof. The conductive ring may be positioned on a surface of the PCB 206, or may be embedded within the PCB 206, or may have one or more portions on a surface of the PCB 206 and one or more portions embedded within the PCB 206.

Referring to FIGS. 9-15, a sensor module 300 for installation on patch panels 12 with fiber optic connector ports (e.g., ST, SC, LC, ports, etc.) 16 is illustrated according to some embodiments of the present invention. The illustrated sensor module 300 has a sideways "H-shape" configuration with an elongated body portion 302. The body portion 302 includes a medial portion 302a with a pair of elongated, spaced apart arms 302b extending away from the medial portion 302a in one direction $D_1$ and a pair of elongated, spaced apart arms 302c extending away from the medial portion 302a in an opposite direction $D_2$. Each pair of arms 302b, 302c have respective free ends such that the end portions 302e, 302f of the body portion 302 are open. The H-shape configuration of the illustrated sensor module 300 with the open end portions 302e, 302f allows the sensor module 300 to be secured to a patch panel 12 without disturbing any patch cords connected to the patch panel 12. For example, the arms in each pair of arms 302b, 302c can be moved apart somewhat to allow the sensor module 300 to be installed. As such, the sensor module 300 can be installed on patch panels without requiring any patch cords to be removed and, thus, without disrupting service.

In other embodiments, the sensor module 300 can be implemented as two separate portions. For example, a first portion containing emitters or sensors can be secured to the patch panel 12 on one side of the connector ports 16 and a second portion containing emitters or sensors can be secured to the patch panel 12 on the opposite side of the connector ports 16. The two portions can be electrically coupled via a jumper cable, for example.

In some embodiments, the sensor module 300 is secured to the patch panel via fasteners 305 (e.g., screws, rivets, bolts, etc.). The fasteners 305 are inserted through apertures 309 in the sensor module 300 and secured to the patch panel 12, for example, via corresponding apertures, threaded passages, etc., as would be understood by those skilled in the art. In some embodiments, the sensor module 300 may be adhesively or magnetically secured to the patch panel 12.

Similar to the construction of the sensor module 200 described above with respect to FIGS. 4-8, the body portion 302 of the sensor module 300 includes a housing 303, a printed circuit board (PCB) 306 and a plurality of pairs of infrared (IR) emitters 308 and sensors 310 (FIG. 13) operably connected to the circuitry of the PCB 306. The housing 303 surrounds the PCB 306 and the IR emitters 308 and sensors 310. The PCB 306 also includes a processor and memory (not shown). The memory contains firmware executable by the processor for controlling the IR emitters 308 and sensors 310. The PCB 306, IR emitters 308, sensors 310, processor and memory obtain power from a rack controller associated with the patch panel 12. An outer surface of the PCB 306 may include an overlay 307, which is a protective covering material.

Figure 14:
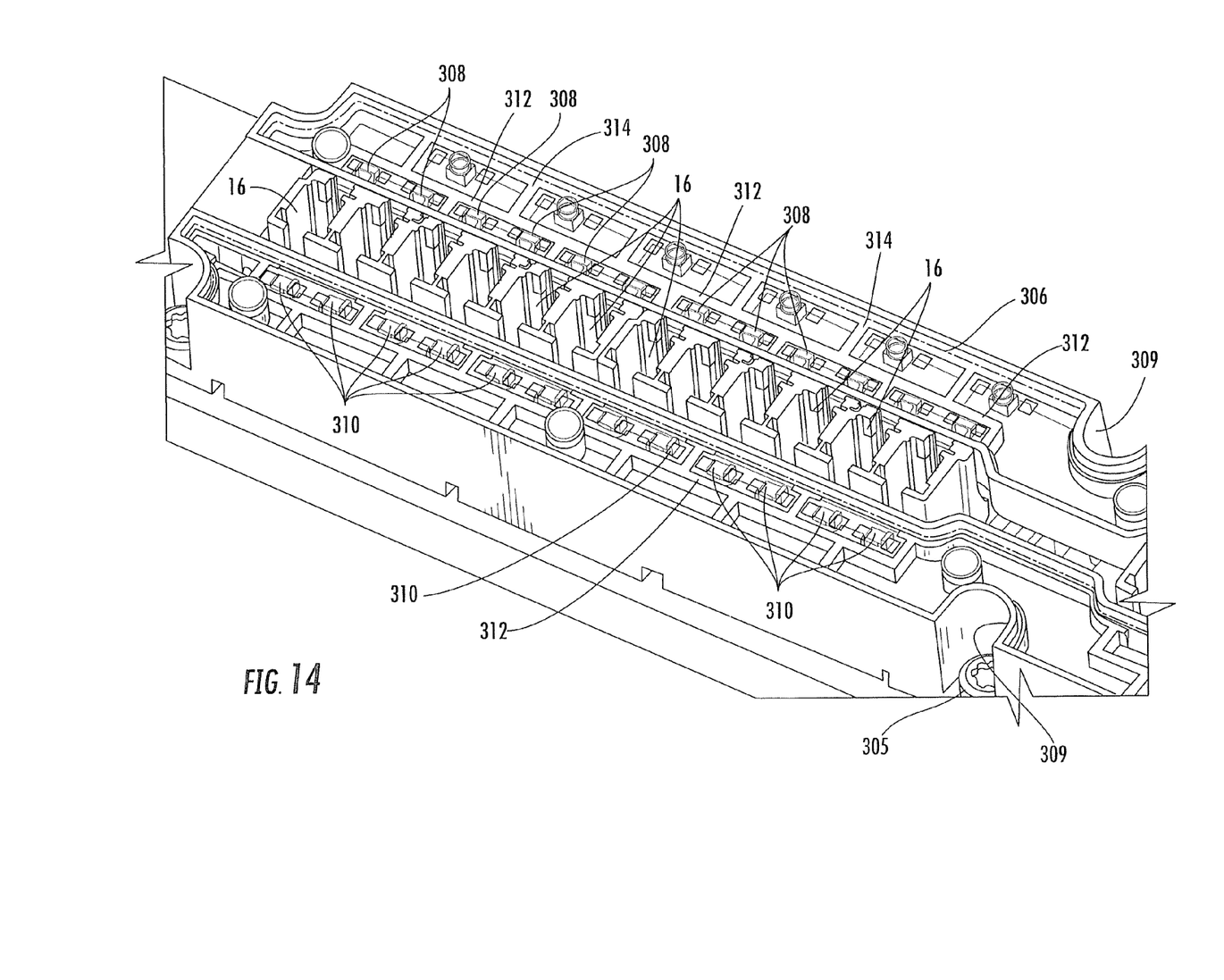
FIG. 14 is a partial perspective view of the patch panel and sensor module of FIG. 9 illustrating various protective walls of the sensor module housing, according to some embodiments of the present invention.

The IR emitters and sensors 308, 310 are configured to sense the insertion and removal of patch cords into and from the patch panel connector ports 16. In the illustrated embodiment, each IR emitter 308 is located above a respective connector port 16 when the sensor module 300 is installed on a patch panel 12, and each corresponding IR sensor 310 is located beneath a respective connector port 16, as illustrated in FIG. 14. However, embodiments of the present invention are not limited to this configuration. In other embodiments, the IR emitters 308 can be located beneath respective connector ports 16 and the IR sensors 310 can be located above respective connector ports 16. In other embodiments, the IR emitters 308 and sensors 310 can be located on the same side of a connector port 16.

As illustrated in FIG. 14, the sensor module housing 303 has a structure such that a passageway is provided from each IR emitter 308 to a respective connector port 16 and such that no obstruction of an IR beam can occur between the emitter 308 and connector port 16. The sensor module housing 303 also has a structure such that a passageway is provided from each IR sensor 310 to a respective connector port 16 and such that no obstruction of an IR beam can occur between the sensor 310 and the connector port 16.

Each IR sensor 310 is configured to detect whether an IR beam emitted by a respective emitter 308 has been blocked. In operation, an IR emitter 308 emits an infrared signal and the corresponding sensor 310 looks for the signal. If the IR beam is not detected, the sensor sends a signal to the processor that a patch cord connector 41 is inserted in the respective connector port 16. The presence and absence of a patch cord connector 41 within a respective connector port 16 is communicated by the sensor module processor to a rack controller, as would be understood by those skilled in the art.

Figure 13:
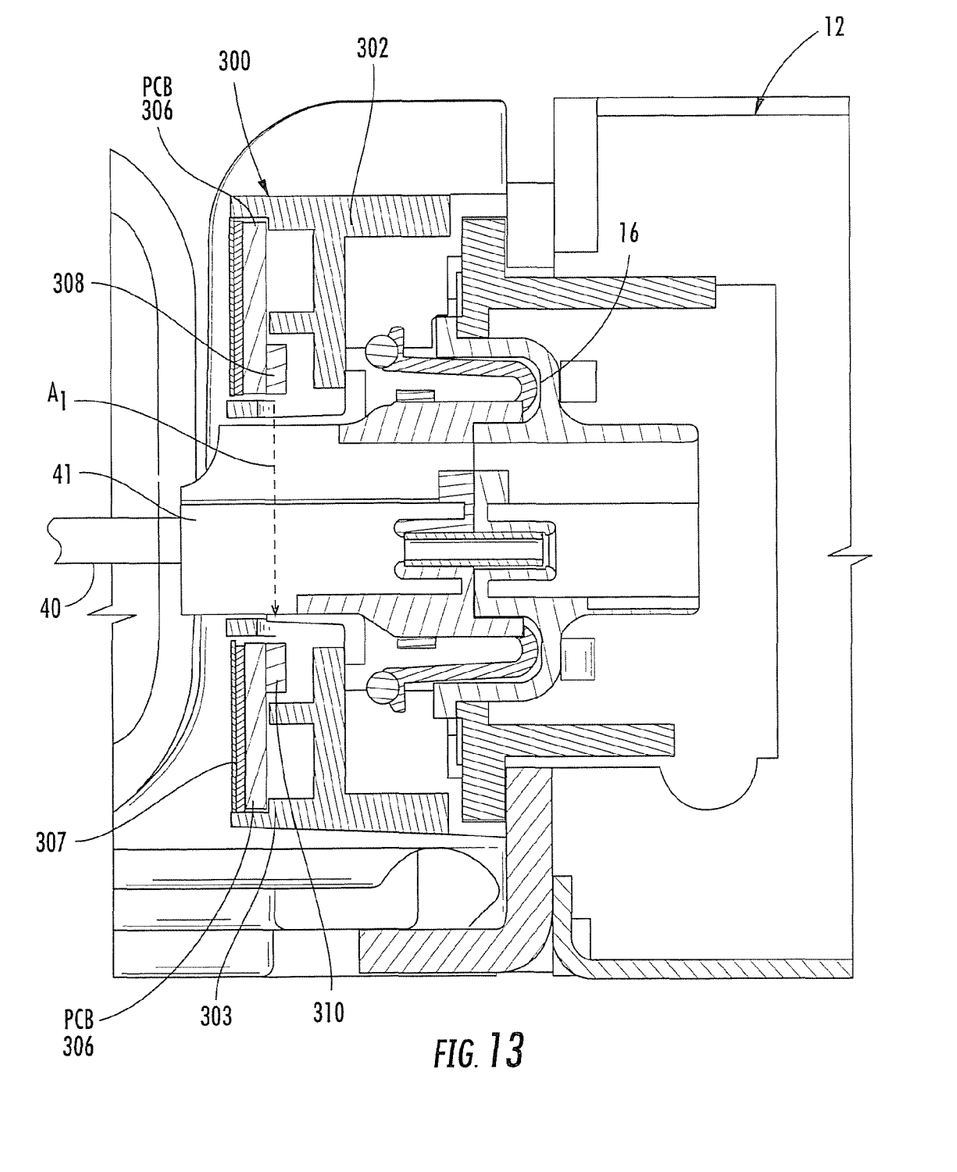
FIG. 13 is a cross section view of the patch panel and sensor module of FIG. 9 illustrating a patch cord connector inserted within a connector port and illustrating the location of the PCB and an IR emitter/sensor pair.

As illustrated in FIG. 13, a patch cord connector 41 of a patch cord 40 is inserted within a connector port 16 of the patch panel 12. An IR beam, indicated by down arrow $A_1$, is emitted by the emitter 308. The emitted IR beam is blocked by the patch cord connector 41. Thus, the illustrated IR sensor 310 sends a signal to the processor that a patch cord connector 41 is inserted in the respective connector port 16. In FIG. 13, the IR beam $A_1$ is indicated to show the path of the beam, although it would be understood that the connector 41 inserted within the connector port 16 would block the IR beam $A_1$. In other embodiments, the connector 41 may be translucent such that the IR beam $A_1$ passes therethrough when the connector 41 is inserted within the connector port 16. In this embodiment, the end of the connector 41 breaks the IR beam during insertion and removal, thereby indicating insertion and removal thereof.

The sensor module firmware also includes an algorithm that is configured to filter out unwanted IR signals from other IR emitting sources, e.g., natural sunlight, overhead light sources such as halogen lights, flashlights, other IR transmitting equipment, etc. To compensate for these other IR sources, the algorithm can employ several techniques including, but not limited to, IR background level sensing, timing, and waveform analysis.

In addition to using an algorithm, some background IR can be eliminated by recessing the IR sensors 310 within the sensor module 300 and creating a shroud to block out background IR. In addition, the PCB 306 can be coated with a non-reflective solder mask to reduce or eliminate reflections.

In some embodiments, the housing 303 of the sensor module 300 includes protective structures to protect the IR emitters and sensors 308, 310 from physical damage and damage from static electricity. Referring to FIG. 14, the housing 303 of the sensor module 300 is shown as a wire frame model to illustrate the structural configuration thereof. The housing 303 includes walls 312 that serve as physical barriers around each IR emitter and sensor 308, 310, as illustrated, to protect the IR emitters 308 and sensors 310 from physical damage. The walls 312 (or portions thereof) may also be electrically conductive and grounded to protect the IR emitters 308 and sensors 310 from static electricity. The housing 303 also includes walls or reinforcing members 314 that provide structural integrity to the sensor module 300. The housing 303 of the sensor module 300 may be formed from any of various materials (e.g., polymeric materials, etc.) and the illustrated walls 312, 314 may be molded into the housing 303, as would be understood by those of skill in molded components. Virtually any type of structure may be utilized to protect the IR emitters and sensors 308, 310 from physical damage and static electricity. Embodiments of the present invention are not limited to the illustrated walls 312, 314 and configuration thereof.

According to some embodiments of the present invention, the PCB 306 may include a conductive member or ring (not shown) that is grounded and that serves the purpose of protecting the electronic components (processor, memory, IR emitters, IR sensors) from static electricity. The conductive ring may have virtually any configuration. In some embodiments, the conductive ring extends around a periphery of the PCB 306 to protect all of the electronic components thereof.

The conductive ring may be positioned on a surface of the PCB 306, or may be embedded within the PCB 306, or may have one or more portions on a surface of the PCB 306 and one or more portions embedded within the PCB 306.

According to other embodiments of the present invention, the PCB (e.g., 306) of a sensor module (e.g., 300) can include an array of IR sensors. The PCB is filled with sensors to detect patch cords in other locations other than the standard positions on patch panels. This allows the detection of connections to other equipment such as switches and same equipment.

According to other embodiments of the present invention, a reflective label can be inserted into a patch cord connector 41 and used to create a unique IR (or other type of) signature. This signature could be used to identify the type of patch cord or be used to create a unique combination of patch cords that can used to secure a connection. The unique signature, once detected, could be used to enable or disable the connector port 16. For example, if it is determined, via detection of an IR signature of a particular patch cord connector, that a patch cord should not be connected with a particular connector port 16, the processor or rack controller can "park" the connector port such that the connector port 16 cannot be used without authorization. The term "park" means that a connector port 16 is essentially disabled and cannot be used to access a particular network or other device/service without authorization. In some embodiments, an administrator or other authorized person may be notified when a connector port 16 has been parked. Connector port parking is an advantageous security feature of embodiments of the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein. The following exemplary claims are presented in the specification to support one or more devices, features, and methods of embodiments of the present invention. While not particularly listed below, Applicant preserves the right to claim other features shown or described in the application.

That which is claimed is:

1. A communications patching system, comprising:
    a patch panel having a plurality of connector ports on a side thereof; and
    a sensor module secured to the patch panel side, wherein the sensor module comprises a housing and a plurality of pairs of IR emitters and sensors within the housing, wherein the sensor module is secured to the patch panel such that each emitter/sensor pair is located adjacent to a respective one of the connector ports, wherein each pair is configured to detect insertion and removal of a patch cord connector from a respective connector port, wherein the housing comprises a separate unobscured passageway between each IR emitter and sensor pair and each connector port, and wherein each passageway is configured to block IR light scattering and to block unwanted IR signals and/or reflections from a source external to the patch panel.

2. The patching system of claim 1, wherein the sensor module comprises a printed circuit board (PCB) secured to the housing, and wherein the IR emitters and sensors are electrically connected to the PCB, and wherein the PCB includes a processor and memory for controlling the IR emitters and sensors.

3. The patching system of claim 2, wherein the memory contains firmware executable by the processor for controlling operation of the IR emitters and sensors.

4. The patching system of claim 2, wherein the memory contains firmware executable by the processor for filtering out unwanted IR signals and/or reflections of IR signals from a source external to the patch panel.

5. The patching system of claim 2, wherein the memory contains firmware executable by the processor for compensating for IR reflections from different patch cord connector surfaces.

6. The patching system of claim 2, wherein the housing comprises a plurality of walls that surround the IR emitters and sensors and protect the IR emitter and sensors from damage.

7. The patching system of claim 6, wherein the walls form respective unobstructed passageways between each IR emitter and corresponding sensor.

8. The patching system of claim 6, wherein the walls are electrically conductive and are grounded to protect the IR emitters and sensors from static electricity.

9. The patching system of claim 1, wherein the PCB includes one or more conductive elements that protect the IR emitters and sensors from static electricity.

10. The patching system of claim 9, wherein the one or more conductive elements comprise a conductive ring that extends around a periphery of the PCB.

11. The patching system of claim 1, wherein the sensor module has an H-shaped configuration.

12. The patching system of claim 9, wherein the sensor module has open end portions.

13. The patching system of claim 1, wherein the sensor module has a comb-shaped configuration.

14. The patching system of claim 1, wherein the connector ports are configured to receive optical patch cord connectors.

15. The patching system of claim 1, wherein the connector ports are configured to receive electrical patch cord connectors.

16. The patching system of claim 1, wherein the sensor module comprises a first portion secured to one side of the connector ports and a second portion secured to the opposite side of the connector ports, and wherein the first and second portions are electrically connected together via a jumper cable.

17. The patching system of claim 16, wherein the first portion includes the IR emitters and the second portion includes the IR sensors.

18. The patching system of claim 16, wherein the first portion includes the IR sensors and the second portion includes the IR emitters.

19. A communications patching system, comprising:
a patch panel having a plurality of connector ports on a side thereof;
one or more patch cords, each configured to selectively connect respective pairs of patch panel connector ports, wherein each patch cord includes opposite ends with a connector attached thereto, wherein each connector for a respective patch cord includes an IR-reflective label that creates a unique reflective signature when exposed to IR radiation; and
a sensor module secured to the patch panel side, wherein the sensor module comprises a housing, a printed circuit board (PCB) secured to the housing, and a plurality of pairs of IR emitters and sensors electrically connected to the PCB, a processor and memory for controlling the IR emitters and sensors, wherein the sensor module is secured to the patch panel such that each emitter/sensor pair is located adjacent to a respective one of the connector ports, wherein each IR sensor is configured to detect a reflective signature from a patch cord connector and to detect insertion and removal of a patch cord connector from a respective connector port, and wherein the memory contains firmware executable by the processor that parks a connector port in response to detecting an unauthorized reflective signature from a patch cord connector.

20. A patch cord, comprising opposite ends, each with a connector attached thereto, wherein each connector includes an IR-reflective label that creates a unique reflective signature when exposed to IR radiation.

21. A communications patching system, comprising:
a patch panel having a plurality of connector ports on a side thereof; and
a sensor module secured to the patch panel side, wherein the sensor module comprises a housing, a printed circuit board (PCB) secured to the housing, and a plurality of pairs of IR emitters and sensors electrically connected to the PCB,
a processor and memory for controlling the IR emitters and sensors,
wherein the sensor module is secured to the patch panel such that each emitter/sensor pair is located adjacent to a respective one of the connector ports, wherein each emitter/sensor pair is configured to detect insertion and removal of a patch cord connector from a respective connector port, and
wherein the housing comprises a plurality of walls that surround the IR emitters and sensors and protect the IR emitter and sensors from damage, wherein the walls form respective unobstructed passageways between each IR emitter and corresponding sensor.

22. A communications patching system, comprising:
a patch panel having a plurality of connector ports on a side thereof; and
a sensor module secured to the patch panel side, wherein the sensor module comprises a housing, a printed circuit board (PCB) secured to the housing, and a plurality of pairs of IR emitters and sensors electrically connected to the PCB,
a processor and memory for controlling the IR emitters and sensors,
wherein the sensor module is secured to the patch panel such that each emitter/sensor pair is located adjacent to a respective one of the connector ports, wherein each emitter/sensor pair is configured to detect insertion and removal of a patch cord connector from a respective connector port, and
wherein the housing comprises a plurality of walls that surround the IR emitters and sensors and protect the IR emitter and sensors from damage, and wherein the walls are electrically conductive and are grounded to protect the IR emitters and sensors from static electricity.

23. A communications patching system, comprising:
a patch panel having a plurality of connector ports on a side thereof; and
a sensor module secured to the patch panel side, wherein the sensor module comprises a housing, a printed circuit board (PCB) secured to the housing, and a plurality of pairs of IR emitters and sensors electrically connected to the PCB, wherein the PCB includes one or more conductive elements that protect the IR emitters and sensors from static electricity, a processor and memory for controlling the IR emitters and sensors, wherein the sensor module is secured to the patch panel such that each emitter/sensor pair is located adjacent to a respective one of the connector ports, wherein each emitter/sensor pair is configured to detect insertion and removal of a patch cord connector from a respective connector port.

24. A communications patching system, comprising:

a patch panel having a plurality of connector ports on a side thereof; and a sensor module secured to the patch panel side, wherein the sensor module comprises a plurality of pairs of IR emitters and sensors, wherein the sensor module is secured to the patch panel such that each emitter/sensor pair is located adjacent to a respective one of the connector ports, and wherein each emitter/sensor pair is configured to detect insertion and removal of a patch cord connector from a respective connector port, wherein the sensor module comprises a first portion secured to one side of the connector ports and a second portion secured to the opposite side of the connector ports, and wherein the first and second portions are electrically connected together via a jumper cable.

* * * * *

UNITED STATES PATENT AND TRADEMARK OFFICE
CERTIFICATE OF CORRECTION

PATENT NO. : 8,344,900 B2  
APPLICATION NO. : 12/612750  
DATED : January 1, 2013  
INVENTOR(S) : Fariello et al.

Page 1 of 1

It is certified that error appears in the above-identified patent and that said Letters Patent is hereby corrected as shown below:

In the Specification:
Column 12, Lines 10 and 11: Please correct "switches and same equipment."
to read -- switches and san equipment. --

Signed and Sealed this
Sixteenth Day of April, 2013

Teresa Stanek Rea
*Acting Director of the United States Patent and Trademark Office*